(12) United States Patent
Pajukoski et al.

(10) Patent No.: US 10,044,489 B2
(45) Date of Patent: Aug. 7, 2018

(54) ENHANCED INTER-NETWORK ACCESS NODE SCHEDULING COORDINATION AND SIGNALING SUPPORT FOR ADVANCED RECEIVER ALGORITHMS

(75) Inventors: Kari Pekka Pajukoski, Oulu (FI); Esa Tapani Tiirola, Kempele (FI); Kari Juhani Hooli, Oulu (FI); Tommi Koivisto, Espoo (FI); Marko Lampinen, Oulu (FI); Lars Lindh, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 106 days.

(21) Appl. No.: 13/278,310

(22) Filed: Oct. 21, 2011

(65) Prior Publication Data

US 2012/0099544 A1    Apr. 26, 2012

Related U.S. Application Data

(60) Provisional application No. 61/455,541, filed on Oct. 22, 2010.

(51) Int. Cl.
*H04W 72/04* (2009.01)
*H04L 5/00* (2006.01)
(Continued)

(52) U.S. Cl.
CPC ........ *H04L 5/0092* (2013.01); *H04J 11/0026* (2013.01); *H04L 5/0032* (2013.01); *H04B 7/024* (2013.01); *H04W 72/1226* (2013.01)

(58) Field of Classification Search
CPC .................................................... H04W 72/04
(Continued)

(56) References Cited

U.S. PATENT DOCUMENTS

2003/0067872 A1    4/2003    Harrell et al. ................. 370/229
2003/0123540 A1    7/2003    Zhong et al. ............ 375/240.07
(Continued)

FOREIGN PATENT DOCUMENTS

EP    2341732 A1    7/2011
EP    2266358 B1    5/2012
(Continued)

OTHER PUBLICATIONS

Motorola, 3GPP TSG-RAN Meeting #62, R1-105111, "Draft Change Request, 36.213 CR 9.2.0, Introduction of Rel-10 LTE-Advanced features in 36.213", Madrid, Spain, Aug. 23-27, 2010, 84 pages.

(Continued)

*Primary Examiner* — Edan Orgad
*Assistant Examiner* — Nourali Mansoury
(74) *Attorney, Agent, or Firm* — Harrington & Smith

(57) ABSTRACT

A method includes operating a network access node to determine, in cooperation with at least one other network access node, a coordinated scheduling granularity having a plurality of physical resource blocks; and signaling an indication of the determined coordinated scheduling granularity to at least one mobile device served by the network access node for use in enhancing estimation at a receiver of the mobile device, such as when estimating an interference covariance matrix. Apparatus for performing the method is also disclosed, as are mobile device methods and apparatus for receiving and using the signaling.

15 Claims, 4 Drawing Sheets

(51) Int. Cl.
    *H04J 11/00* (2006.01)
    *H04B 7/024* (2017.01)
    *H04W 72/12* (2009.01)
(58) Field of Classification Search
    USPC .......................................................... 370/329
    See application file for complete search history.

(56) References Cited

U.S. PATENT DOCUMENTS

| | | |
|---|---|---|
| 2004/0186877 A1 | 9/2004 | Wang et al. ................. 709/200 |
| 2004/0187136 A1 | 9/2004 | Bhogal et al. ................ 719/370 |
| 2005/0171984 A1 | 8/2005 | Wang et al. |
| 2006/0120282 A1 | 6/2006 | Carlson et al. |
| 2006/0268708 A1 | 11/2006 | Speight et al. ............... 370/235 |
| 2007/0280105 A1 | 12/2007 | Barkay et al. ................ 370/229 |
| 2008/0225829 A1 | 9/2008 | Sachs et al. .................. 370/351 |
| 2010/0110887 A1 | 5/2010 | Beaujean et al. |
| 2010/0121977 A1 | 5/2010 | Kontola ........................ 709/232 |
| 2010/0235542 A1 | 9/2010 | Visharam et al. ............ 709/246 |
| 2010/0254335 A1 | 10/2010 | Koo et al. |
| 2011/0202674 A1 | 8/2011 | Su et al. ....................... 709/231 |
| 2011/0225315 A1 | 9/2011 | Wexler et al. ................ 709/231 |
| 2012/0030143 A1 | 2/2012 | Chen et al. ................... 705/400 |
| 2012/0063294 A1* | 3/2012 | Osterling et al. ............ 370/210 |
| 2012/0072678 A1 | 3/2012 | Biswas et al. ................ 711/154 |
| 2012/0140726 A1* | 6/2012 | Moon et al. .................. 370/329 |
| 2012/0147831 A1* | 6/2012 | Golitschek ................... 370/329 |
| 2012/0170510 A1* | 7/2012 | Kim et al. .................... 370/315 |
| 2012/0236752 A1* | 9/2012 | Hu et al. ....................... 370/252 |
| 2012/0238263 A1* | 9/2012 | Caretti et al. ............. 455/426.1 |
| 2012/0238313 A1 | 9/2012 | Zhou |
| 2012/0263434 A1 | 10/2012 | Wainner et al. ............. 386/241 |
| 2012/0331478 A1 | 12/2012 | Zhu et al. |
| 2013/0153298 A1* | 6/2013 | Pietraski et al. ................ 175/45 |
| 2013/0155966 A1 | 6/2013 | Bekiares et al. ............. 370/329 |
| 2013/0282918 A1 | 10/2013 | De Vleeschauwer et al. ............................. 709/231 |
| 2013/0286873 A1 | 10/2013 | Wilkinson et al. ........... 370/252 |
| 2013/0290493 A1 | 10/2013 | Oyman et al. ................ 709/219 |
| 2013/0301539 A1 | 11/2013 | Aguirre et al. |
| 2013/0326061 A1 | 12/2013 | Li .................................. 709/224 |
| 2014/0082146 A1 | 3/2014 | Bao et al. |
| 2014/0185452 A1 | 7/2014 | Kakadia et al. .............. 370/236 |

FOREIGN PATENT DOCUMENTS

| | | |
|---|---|---|
| WO | WO 2010/101431 A2 | 9/2010 |
| WO | WO-2010/128668 A1 | 11/2010 |
| WO | WO 2011/063854 A1 | 6/2011 |

OTHER PUBLICATIONS

Alcatel Shanghai Bell et al., 3GPP TSG RAN WG1 Meeting #53bis R1-082501, "Collaborative MIMO for LTE-A downlink", Warsaw, Poland, Jun. 30-Jul. 4, 2008, 7 pages.
3GPP TS 36.211 V9.1.0, "3rd Generation Partnership Project; Technical Specification Group Radio Access Network; Evolved Universal Terrestrial Radio Access (E-UTRA); Physical Channels and Modulation (Release 9)", Mar. 2010, 85 pages.
Samsung, 3GPP TSG RAN WG1 Meeting #60, R1-101173, "Performance evaluation of CoMP CS/CB",San Francisco, USA, Feb. 2010, 5 pages.
3GPP TR 36.913 V9.0.0, "3rd Generation Partnership Project; Technical Specification Group Radio Access Network; Requirements for further advancements for Evolved Universal Terrestrial Radio Access (E-UTRA) (LTE-Advanced) (Release 9)", Dec. 2009, 15 pages.
3GPP TS 36.300 V8.11.0, "Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Dec. 2009, 148 pages.
3GPP TS 36.420 V9.0.0, "3rd Generation Partnership Project; Technical Specification Group Radio Access Network; Evolved Universal Terrestrial Radio Access Network (E-UTRAN); X2 general aspects and principles (Release 9)", Dec. 2009, 12 pages.
3GPP TS 36.423 V9.4.0, "3rd Generation Partnership Project; Technical Specification Group Radio Access Network; Evolved Universal Terrestrial Radio Access Network (E-UTRAN); X2 application protocol (X2AP) (Release 9)", Sep. 2010, 121 pages.
Nokia Siemens Networks et al., 3GPP TSG-RAN WG1 Meeting #60, R1-101431, "CoMP performance evaluation", San Francisco, USA, Feb. 22-26, 2010, 7 pages.
3GPP TS 36.212 V9.2.0, "3rd Generation Partnership Project; Technical Specification Group Radio Access Network; Evolved Universal Terrestrial Radio Access (E-UTRA); Multiplexing and channel coding (Release 9)", Jun. 2010, 61 pages.
3GPP TR 36.912 V9.2.0, "3rd Generation Partnership Project; Technical Specification Group Radio Access Network; Feasibility study for Further Advancements for E-UTRA (LTE-Advanced) (Release 9)", Mar. 2010, 61 pages.
Qualcomm Europe, 3GPP TSG-RAN WG1 #57, R1-092057, "Signaling for spatial coordination in DL CoMP", May 2009, San Francisco, USA, 10 pages.
3GPP TS 36.300 V9.3.0 (Mar. 2010), Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 166 pages.
Panasonic, 3GPP TSG RAN WG1 Meeting #61, R1-102885, "Possibility of UE side ICI cancellation in Hetnet", Montreal, Canada, May 10-14, 2010, 2 pages.
Deutsche Telekom AG et al., 3GPP TSG RAN WG1 Meeting #59, R1-095067, "Coordinated link adaptation based on multi-cell channel estimation in the LTE-A uplink", Jeju, South Korea, Nov. 9-13, 2009, 6 pages.
3GPP TS 36.314 V11.0.0, "3$^{rd}$ Generation Partnership Project; Technical Specification Group Radio Access Network; evolved Universal Terrestrial Radio Access (E-UTRA); Layer 2-Measurements (Release 11)", Sep. 2012.
"Quality of Service Solutions in HSPA RAN", Nokia Siemens Networks, 2009, 18 pgs.
3GPP TS 26.234 V11.0.0 (Mar. 2012); 3rd Generation Partnership Project; Technical Specification Group Services and System Aspects; Transparent end-to-end Packet-switched Streaming Service (PSS); Protocols and codecs (Release 11) (169 pages).
ETSI TS 126 233 V8.0.0 (Jan. 2009); Universal Mobile Telecommunications System (UMTS); LTE; End-to-end transparent streaming service; General description (3GPP TS 26.233 version 8.0.0 Release 8) (16 pages).
S4-110174; 3GPP TSG-SA4 #62; Editor; "HTTP-based Streaming and Download Services—Use cases, requirements and working assumptions: Permanent Document"; Jan. 10-14, 2011; Berlin, Germany (21 pages.).
Cheluvaraju, et al.; "Anticipatory Retrieval and Caching of Data for Mobile Devices in Variable-Bandwidth Environments"; 2011 IEEE International; Systems Conference (SYSCON); Apr. 4, 2011; pp. 531-537.
Nokia Siemens Networks; "Composite information on available resources for SON load balancing"; R3-091354; 3GPP TSG RAN WG3 Meeting #64; May 4-8, 2009, San Francisco, USA; whole document (3 pages).
T. Bhadare; "LTE and WiMAX Comparison"; Dec. 2008; 59 pages (pp. 16-19).

* cited by examiner

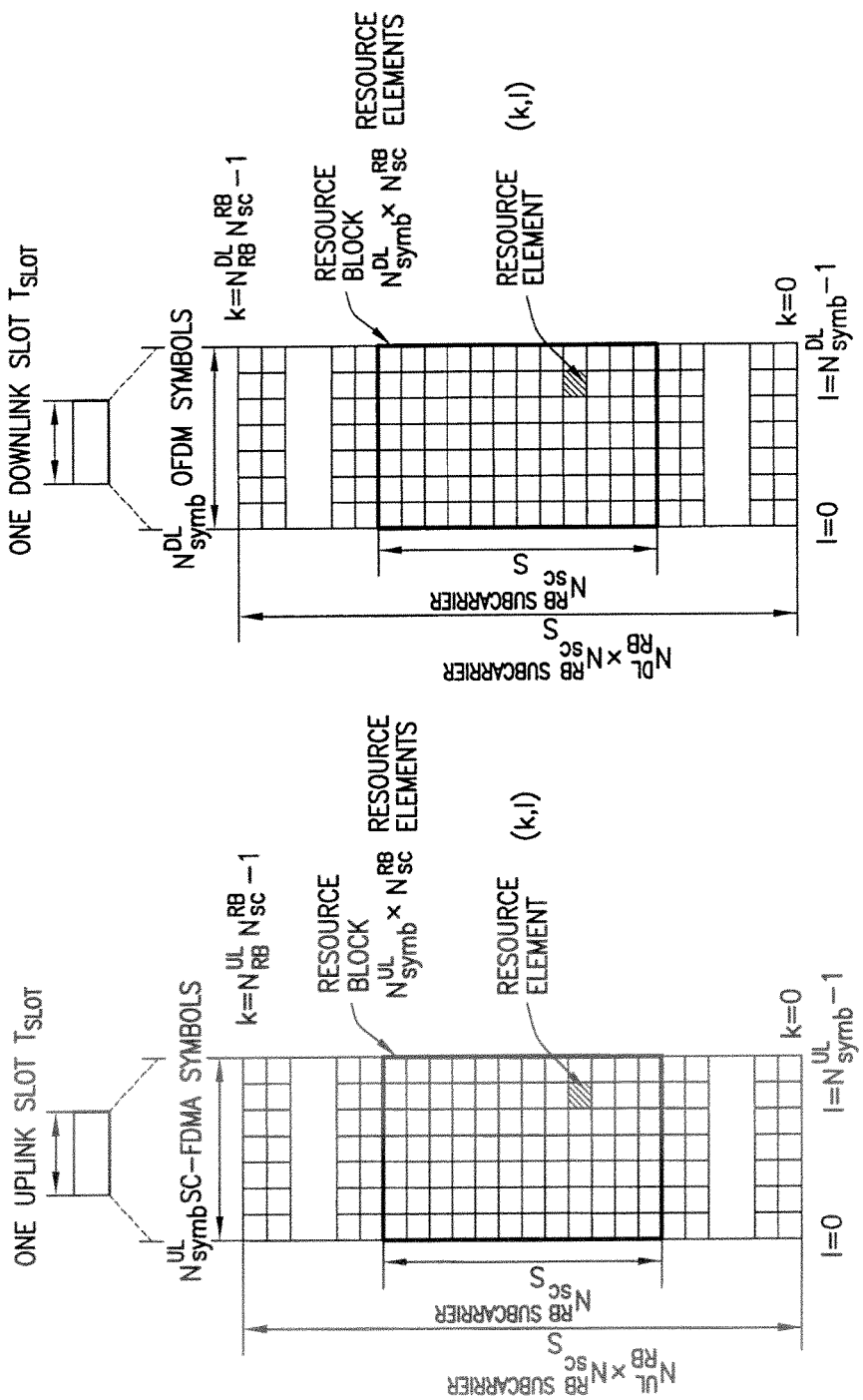

ENHANCED INTER-NETWORK ACCESS NODE SCHEDULING COORDINATION AND SIGNALING SUPPORT FOR ADVANCED RECEIVER ALGORITHMS

CLAIM OF PRIORITY FROM COPENDING PROVISIONAL PATENT APPLICATION

This patent application claims priority under 35 U.S.C. § 119(e) from Provisional Patent Application No. 61/455,541, filed Oct. 22, 2010, the disclosure of which is incorporated by reference herein in its entirety, including all Exhibits appended thereto.

TECHNICAL FIELD

The exemplary and non-limiting embodiments of this invention relate generally to wireless communication systems, methods, devices and computer programs and, more specifically, relate to enhanced interference rejection combining (IRC) reception techniques.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BS base station
BW bandwidth
CoMP coordinated multiple point transmission and reception
DCI downlink control information
DL downlink (eNB towards UE)
eNB E-UTRAN Node B (evolved Node B)
EPC evolved packet core
E-UTRAN evolved UTRAN (LTE)
FDMA frequency division multiple access
HSPA high speed packet access
IMT-A international mobile telecommunications association
ICI inter-cell interference
ICIC inter-cell interference coordination
IRC interference rejection combining
ITU-R international telecommunication union-radiocommunication sector
LTE long term evolution of UTRAN (E-UTRAN)
LTE-A LTE advanced
MAC medium access control (layer 2, L2)
MM/MME mobility management/mobility management entity
NodeB base station
OFDMA orthogonal frequency division multiple access
O&M operations and maintenance
PDCCH physical downlink control channel
PDCP packet data convergence protocol
PHY physical (layer 1, L1)
PRB physical resource block
PRG precoding resource block group
Rel release
RBG resource block group
RLC radio link control
RRC radio resource control
RRM radio resource management
RS reference signal
SGW serving gateway
SC-FDMA single carrier, frequency division multiple access
UE user equipment, such as a mobile station, mobile node or mobile terminal
UL uplink (UE towards eNB)
UPE user plane entity
UTRAN universal terrestrial radio access network One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009-12), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.3.0 (2010-03).

FIG. 1A reproduces FIG. 4.1 of 3GPP TS 36.300 V8.11.0, and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:

functions for RRM: RRC, Radio Admission Control, Connection Mobility Control, Dynamic allocation of resources to UEs in both UL and DL (scheduling);

IP header compression and encryption of the user data stream;

selection of a MME at UE attachment;

routing of User Plane data towards the EPC (MME/S-GW);

scheduling and transmission of paging messages (originated from the MME);

scheduling and transmission of broadcast information (originated from the MME or O&M); and a measurement and measurement reporting configuration for mobility and scheduling.

Of particular interest herein are the further releases of 3GPP LTE (e.g., LTE Rel-10, LTE Rel-11) targeted towards future IMT-A systems, referred to herein for convenience simply as LTE-Advanced (LTE-A). Reference in this regard may be made to 3GPP TR 36.913, V9.0.0 (2009-12), 3rd Generation Partnership Project; Technical Specification Group Radio Access Network; Requirements for Further Advancements for E-UTRA (LTE-Advanced) (Release 9).

Reference can also be made to 3GPP TR 36.912 V9.2.0 (2010-03) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LIE-A will be a more optimized radio system fulfilling the ITU-R requirements for IMT-Advanced while keeping the backward compatibility with LTE Rel-8.

As is specified in 3GPP TR 36.913, LTE-A should operate in spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

With increasing data traffic volumes more capacity is required to be provided by the wireless networks. The capacity can be increased by adding more network access nodes, i.e., base stations, hence making cell sizes smaller. In this case fewer UEs are served by one cell. Similarly, it is possible to offload some of the traffic to, for example, home eNBs (home base stations) or other smaller cells. These smaller cells can operate in the same frequency band as the larger macro cells, a situation that is currently being studied in a 3GPP Work Item on ICIC in heterogeneous networks. Offloading traffic can also be done to a separate frequency carrier that is dedicated to home eNBs or local area networks.

One common problem that arises in all of these scenarios is that the link performance becomes increasingly limited by inter-cell interference (ICI). One approach to attempt to overcome this problem is to provide enhanced receiver algorithms capable of suppressing or cancelling at least some of the inter-cell interference. Typically such enhanced receiver algorithms require some knowledge of the inter-cell interference such as, for example, the covariance matrix of the ICI in the case of interference rejection combining (IRC).

SUMMARY

The foregoing and other problems are addressed and overcome by the use of the exemplary embodiments of this invention.

In a first aspect thereof the exemplary embodiments of this invention provide a method that comprises operating a network access node to determine, in cooperation with at least one other network access node, a coordinated scheduling granularity comprised of a plurality of physical resource blocks; and signaling an indication of the determined coordinated scheduling granularity to at least one mobile device served by the network access node to enhance estimation at a receiver of the at least one mobile device.

In another aspect thereof the exemplary embodiments of this invention provide an apparatus that comprises a processor and a memory including computer program code. The memory and computer program code are configured to, with the processor, cause a network access node to determine, in cooperation with at least one other network access node, a coordinated scheduling granularity comprised of a plurality of physical resource blocks, and to signal an indication of the determined coordinated scheduling granularity to at least one mobile device served by the network access node to enhance estimation at a receiver of the at least one mobile device.

In yet another aspect thereof the exemplary embodiments of this invention provide a method that comprises receiving signaling at a mobile device from a network access node, the received signaling comprising information descriptive of a scheduling granularity that is comprised of a plurality of physical resource blocks, where the scheduling granularity is coordinated amongst a plurality of network access nodes; and using the coordinated scheduling granularity at the mobile device to enhance estimation at a receiver of the mobile device.

In a further aspect thereof the exemplary embodiments of this invention provide an apparatus that comprises a processor and a memory including computer program code. The memory and computer program code are configured to, with the processor, cause a mobile device to receive signaling from a network access node, the received signaling comprising information descriptive of a scheduling granularity that is comprised of a plurality of physical resource blocks, where the scheduling granularity is coordinated amongst a plurality of network access nodes; and to use the coordinated scheduling granularity at the mobile device to enhance estimation at a receiver of the mobile device.

In another aspect thereof the exemplary embodiments of this invention provide an apparatus that comprises means for operating a network access node to determine, in cooperation with at least one other network access node, a coordinated scheduling granularity comprised of a plurality of physical resource blocks; means for signaling an indication of the determined coordinated scheduling granularity to at least one mobile device served by the network access node for use in estimating an interference covariance matrix; and means for determining, in cooperation with the at least one other network access node, coordinated orthogonal reference signal radio resources, where said signaling means is further configured to signal an indication of the coordinated orthogonal reference signal radio resources to the at least one mobile device.

BRIEF DESCRIPTION OF THE DRAWINGS

In the attached Drawing Figures:

FIG. 1B reproduces FIG. 5.2.1-1 of 3GPP TS 36.211 V9.1.0, and shows an UL resource grid.

FIG. 1C reproduces FIG. 6.2.2-1 of 3GPP TS 36.211 V9.1.0, and shows a DL resource grid.

DETAILED DESCRIPTION

The exemplary embodiments of this invention pertain in part to providing wireless network support for enhanced interference cancellation at a receiver (UE or eNB).

Figure 1A:
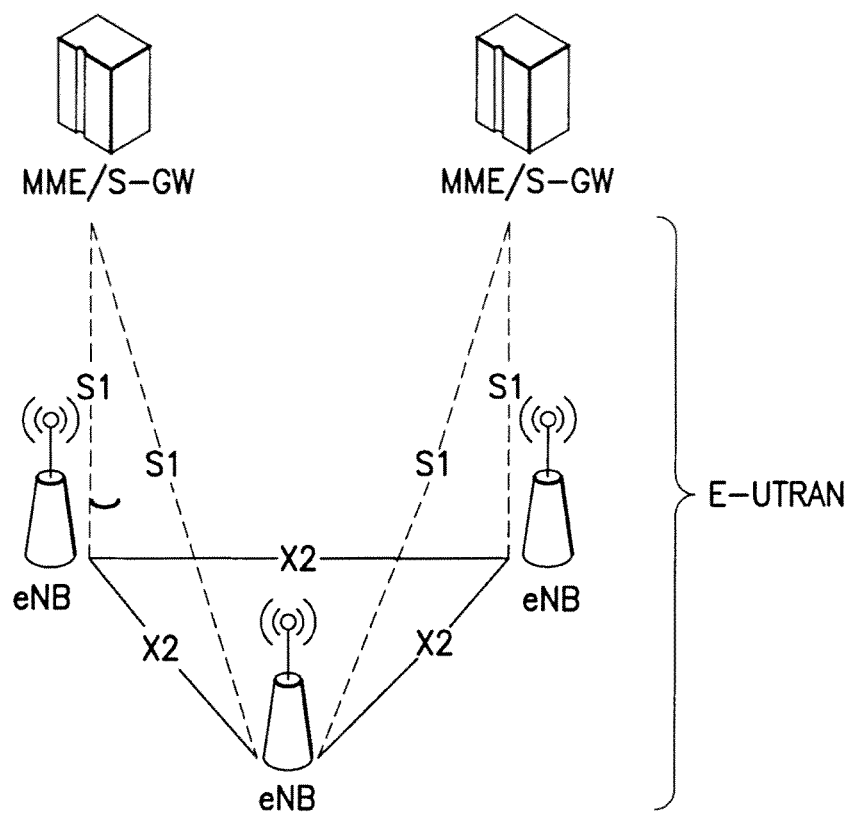
FIG. 1A reproduces FIG. 4.1 of 3GPP TS 36.300, and shows the overall architecture of the EUTRAN system.

Discussed below are physical resource blocks (PRBs). Reference in this regard can be made to 3GPP TS 36.211 V9.1.0 (2010-03) Technical Specification 3rd Generation Partnership Project; Technical Specification Group Radio Access Network; Evolved Universal Terrestrial Radio Access (E-UTRA); Physical Channels and Modulation (Release 9), such as to FIG. 5.2.1-1: Uplink resource grid, reproduced herein as FIG. 1B, and FIG. 6.2.2-1: Downlink resource grid, reproduced herein as FIG. 1C.

As is specified in 3GPP TS 36.211 V9.1.0, section 5.2.1, for the UL the transmitted signal in each slot is described by a resource grid of $N_{RB}^{UL} N_{sc}^{RB}$ subcarriers and $N_{symb}^{UL}$ SC-FDMA symbols. The UL resource grid is illustrated herein in FIG. 1B. The quantity $N_{RB}^{UL}$ depends on the uplink transmission bandwidth configured in the cell and shall fulfil $$N_{RB}^{min,UL} \leq N_{RB}^{UL} \leq N_{RB}^{max,UL}$$

where $N_{RB}^{min,UL}=6$ and $N_{RB}^{max,UL}=110$ are the smallest and largest uplink bandwidths, respectively, supported by the current version of the specification. The number of SC-FDMA symbols in a slot depends on the cyclic prefix length configured by the higher layer parameter UL-CyclicPrefixLength and is given in Table 5.2.3-1.

TABLE 5.2.3-1

Resource block parameters.

| Configuration | $N_{SC}^{RB}$ | $N_{symb}^{UL}$ |
|---|---|---|
| Normal cyclic prefix | 12 | 7 |
| Extended cyclic prefix | 12 | 6 |

In section 5.2.2 the UL resource elements are described. Each element in the resource grid is called a resource element and is uniquely defined by the index pair (k, l) in a slot where k=0, ..., $N_{RB}^{UL} N_{sc}^{RB}-1$ and l=0, ..., $N_{symb}^{UL}-1$ are the indices in the frequency and time domains, respectively. Resource element (k, l) corresponds to the complex value $a_{k,l}$. Quantities $a_{k,l}$ corresponding to resource elements not used for transmission of a physical channel or a physical signal in a slot are set to zero.

In section 5.2.3 the UL resource blocks are described. A physical resource block is defined as $N_{symb}^{UL}$ consecutive SC-FDMA symbols in the time domain and $N_{sc}^{RB}$ consecutive subcarriers in the frequency domain, where $N_{symb}^{UL}$ and $N_{sc}^{RB}$ are given by Table 5.2.3-1. A physical resource block in the uplink thus consists of $N_{symb}^{UL} \times N_{sc}^{RB}$ resource elements, corresponding to one slot in the time domain and 180 kHz in the frequency domain.

The relation between the physical resource block number $n_{PRB}$ in the frequency domain and resource elements (k, l) in a slot is given by $$n_{PRB} = \left\lfloor \frac{k}{N_{sc}^{RB}} \right\rfloor.$$

As is specified in 3GPP TS 36.211 V9.1.0, section 6.2.1, for the DL the transmitted signal in each slot is described by a resource grid of $N_{RB}^{DL} N_{sc}^{RB}$ subcarriers and $N_{symb}^{DL}$ OFDM symbols. The DL resource grid structure is illustrated herein in FIG. 1C. The quantity $N_{RB}^{DL}$ depends on the downlink transmission bandwidth configured in the cell and shall fulfil $$N_{RB}^{min,DL} \leq N_{RB}^{DL} \leq N_{RB}^{max,DL}$$

where $N_{RB}^{min,DL}=6$ and $N_{RB}^{max,DL}=110$ are the smallest and largest downlink bandwidths, respectively, supported by the current version of the specification.

The number of OFDM symbols in a slot depends on the cyclic prefix length and subcarrier spacing configured and is given in Table 6.2.3-1.

TABLE 6.2.3-1

Physical resource blocks parameters.

| Configuration | | $N_{SC}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

In the case of multi-antenna transmission, there is one resource grid defined per antenna port. An antenna port is defined by its associated reference signal. The set of antenna ports supported depends on the reference signal configuration in the cell:

Cell-specific reference signals support a configuration of one, two, or four antenna ports and the antenna port number p shall fulfil p=0, p∈{0,1}, and p∈{0,1,2,3}, respectively.

MBSFN reference signals are transmitted on antenna port p=4.

UE-specific reference signals are transmitted on antenna port(s) p=5, p=7, p=8, or p∈{7,8}.

Positioning reference signals are transmitted on antenna port p=6.

Section 6.2.2 describes the DL resource elements. Each element in the resource grid for antenna port p is called a resource element and is uniquely identified by the index pair (k, l) in a slot where k=0, ..., $N_{RB}^{UL} N_{sc}^{RB}-1$ and l=0, ..., $N_{symb}^{UL}-1$ are the indices in the frequency and time domains, respectively. Resource element (k, l) on antenna port p corresponds to the complex value $a_{k,l}^{(p)}$.

Section 6.2.3 describes the DL resource blocks, where the resource blocks are used to describe the mapping of certain physical channels to resource elements. Physical and virtual resource blocks are defined.

In this context a physical resource block is defined as $N_{symb}^{DL}$ consecutive OFDM symbols in the time domain and $N_{sc}^{RB}$ consecutive subcarriers in the frequency domain, where $N_{symb}^{DL}$ and $N_{sc}^{RB}$ are given by Table 6.2.3-1. A physical resource block thus consists of $N_{symb}^{DL} \times N_{sc}^{RB}$ resource elements, corresponding to one slot in the time domain and 180 kHz in the frequency domain.

The DL physical resource blocks are numbered from 0 to $N_{RB}^{DL}-1$ in the frequency domain. The relation between the physical resource block number $n_{PRB}$ in the frequency domain and resource elements (k, l) in a slot is given by $$n_{PRB} = \left\lfloor \frac{k}{N_{sc}^{RB}} \right\rfloor.$$

A simple and commonly used method of suppressing inter-cell interference at the receiver side uses interference rejection combining (IRC), in which a receiver equipped with multiple antennas estimates the interference covariance matrix and based on the estimate computes a proper weighting for the receiver antennas in order to spatially suppress the interference.

Thus, to implement IRC the receiver (UE or eNB) needs to know the interference covariance matrix. There are basically two methods for obtaining this knowledge. In a first method the receiver estimates the covariance by estimating its serving cell channel, subtracting the serving cell contribution from the received signal, and measuring the covariance from the resulting signal. In a second method the receiver estimates the channel of a strongest (dominant) interferer, estimates the noise power excluding the dominant interferer, and forms the interference covariance matrix with the assumption that the covariance is dominated by the one strongest interferer.

A problem with the first method is that in LTE the UE/eNB typically cannot assume very much about the structure of the interference as the scheduling decisions vary for each subframe and also potentially for each PRB (explained above in reference to FIGS. 1B and 1C). Since the transmission schemes and/or precoders used in each PRB may be different, the interference covariance in different subframes/PRBs can be very different. Due to this type of operation the receiver may perform the covariance estimation only on a per-PRB basis, i.e., the receiver does not extend the estimation over PRB boundaries. As a result the number of samples (measurement samples) available for use in estimating the covariance is very limited, resulting in poor covariance matrix estimates and consequently an insufficient interference rejection capability. Hence, the problem relates to somehow allowing the UE or eNB receiver to estimate the interference covariance matrix from a larger number of samples (without increasing overhead).

Regarding the second method, basically the same problem as outlined above can arise. In addition to this, the second method requires, preferably, orthogonal reference signals between the cells (in the downlink) or UEs (in the uplink) in the allocated PRBs.

Furthermore, the use of this method is effective only when the receiver has available sufficient spatial degrees of freedom for interference suppression, e.g., a 2-Rx (two receive antennas) receiver is capable of suppressing one interfering signal source.

It should be noted that being able to estimate parameters reliably over PRB boundaries may also be beneficial for receiver algorithms other than for the IRC receiver algorithm. An improved channel estimate quality is beneficial for many types of receivers. Further, certain advanced receiver algorithms such as turbo equalization typically also utilize the interference covariance information.

As should be evident, solutions to the foregoing problems require a certain level of coordination between neighboring eNBs and related signaling between the eNB and the UE. This then creates a further problem of how to most effectively and efficiently implement the inter-eNB coordination, as well as how to inform the UE of the coordinated parameters.

IRC with orthogonalized RS between cells has been proposed in 3GPP in the context of heterogeneous networks. Reference in this regard can be made to 3GPP TSG RAN WG 1 Meeting #61, R1-102885, Montreal, Canada, 10-14 May 2010, Source: Panasonic, Title: Possibility of UE side ICI cancellation in Hetnet, Agenda Item: 6.8 Enhanced ICIC for non-CA based deployments of heterogeneous networks for LTE. Signaling between eNBs to coordinate the reference signal usage was not discussed in this document.

The bundling of PRBs for channel estimation purposes has been discussed in RAN1 and specified for Rel-10. An extract from a draft change request (CR) to 3GPP TS 36.213 (R1-105111, 3GPP TSG-RAN Meeting #62, Madrid, Spain, Aug. 23-27, 2010) is reproduced below:

7.1.6.5 PRB Bundling

A UE configured for transmission mode 9 for a given serving cell c may assume that precoding granularity is multiple resource blocks in the frequency domain when corresponding PMI/RI feedback is configured. Fixed system bandwidth dependent Precoding Resource block Groups (PRGs) of size P' partition the system bandwidth and each PRG consists of consecutive PRBs. If $N_{RB}^{DL}$ mod P'>0 then one of the PRGs is of size $N_{RB}^{DL}-P'\lfloor N_{RB}^{DL}/P' \rfloor$. The PRG size is non-increasing starting at the lowest frequency. The UE may always assume that the same precoder applies on all scheduled PRBs within a PRG.

The PRG size a UE may assume for a given system bandwidth is given by:

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

However, this approach only allows the UE to assume the same precoding in its own cell for the number of PRBs indicated by the PRG size, and does not imply anything about the interference. For example, other cells could be using a different resource allocation that does not match with the PRG size, or the other cells could be using other transmission schemes/modes for which the PRB bundling does not apply. Hence the UE can at most assume "continuous" interference within one PRB in the interference estimation.

A proposal has also been made to create two UL DM RS (demodulation reference signal) modes for UL CoMP: 'DM RS adjustment mode' and 'Rel-8 DM RS mode'. In the 'DM RS adjustment mode' the same sequence group is used among the 'DM RS adjustment' mode UEs within the CoMP area, but the DM RS bandwidth (and cyclic shift) alignment over the cells is required. It is noted that the coordination that is considered is limited to DM RS. Additionally, the proposed coordination approach introduces certain differences between the PRB allocated for DM RS and data; the DM RS may be sent using a wider BW than data. In general, coordination of data PRB allocations is important for IRC operation.

An aspect of the exemplary embodiments of this invention is a coordination of the scheduling granularity. A further aspect of the exemplary embodiments of this invention is an enhancement to eNB-UE signaling to assist and enhance estimation at a receiver of a mobile device, such as during the interference covariance matrix estimation process.

Figure 2:
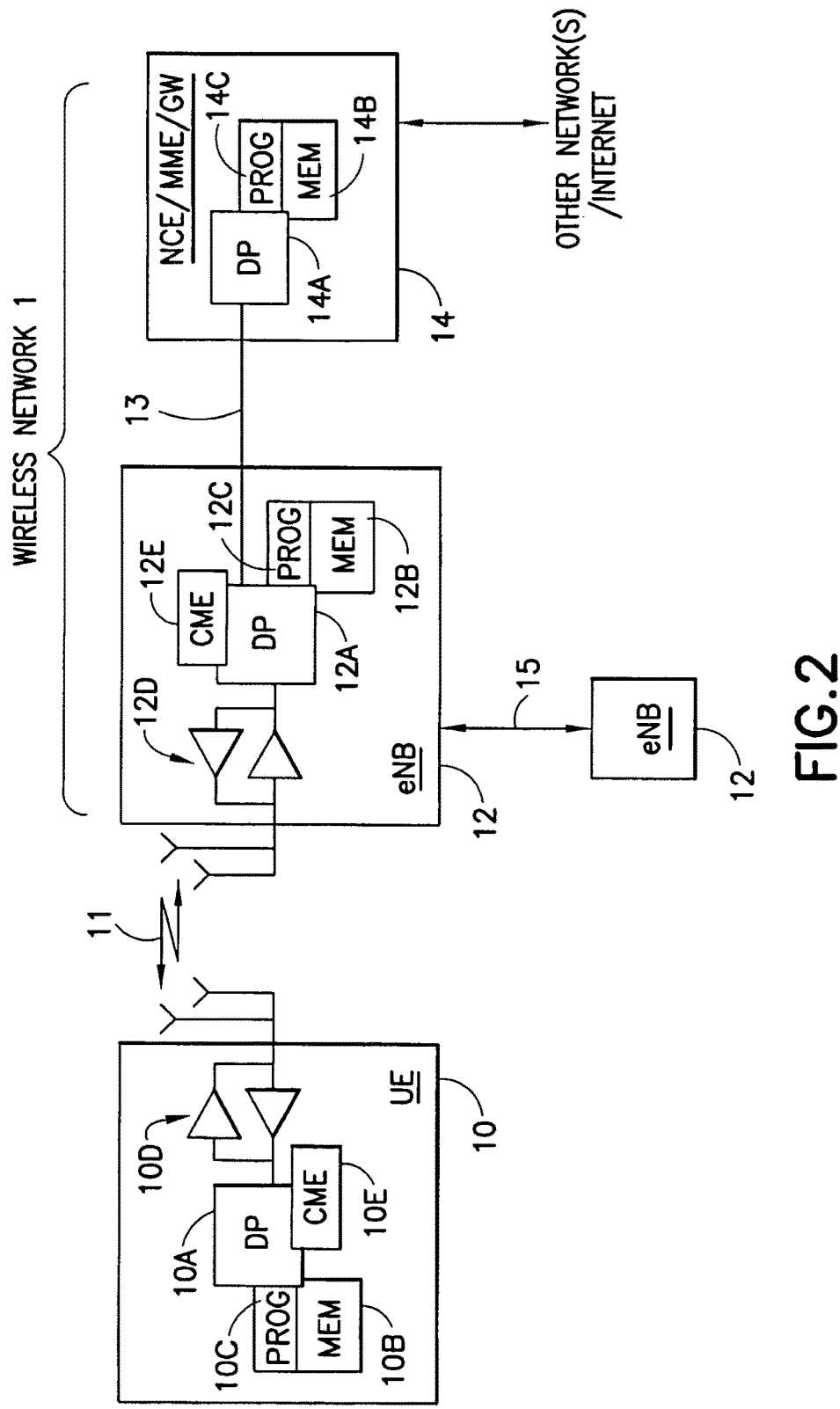
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter/receiver pair (transceiver) 10D for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transmitter/receiver pair (transceiver) 12D for communication with the UE 10 via one or more antennas (typically several when multiple input/multiple output (MIMO) operation is in use). The eNB 12 is coupled via a data/control path 13 to the NCE 14. The path 13 may be implemented as the S1 interface shown in FIG. 1A. The eNB 12 is also coupled to at least one other eNB (e.g., one or more neighbor eNBs 12) via data/control path 15, which may be implemented as the X2 interface shown in FIG. 1A. Inter-NB communication is employed by at least one exemplary embodiment of this invention, as will be described below, and the data/control path 15 may represent the X2 interface or some other inter-eNB communication medium.

For the purposes of describing the exemplary embodiments of this invention the UE 10 may be assumed to also include a covariance matrix estimation (CME) block 10E, and the eNB 12 may also include a CME block 12E.

The PROGs 10C and 12C are assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

In accordance with first exemplary embodiments of this invention there is provided a technique to enable the coordination and signaling exchange between neighboring eNBs 12 in order to allow enhanced estimation of the interference covariance matrix for interference suppression purposes.

A first aspect of the first exemplary embodiments is the coordination of scheduling granularity. As opposed to using a granularity of one PRB, the eNBs 12 agree among themselves to use a lower (coarser) granularity, e.g., 2 PRBs or 3 PRBs, which allows the CMEs 10E/12E of the UE/eNB to estimate the covariance matrix over a larger portion of the BW, and hence with a larger number of samples. This is possible because the interference covariance can be regarded as being substantially constant (or at least continuous) over the agreed upon portion of the BW. In practice this coordination of the scheduling granularity involves negotiation (achieved through signaling) between the eNBs 12.

A second aspect of the first exemplary embodiments is the coordination of reference signals, considered herein as forming a part of the signaling scheme between the eNBs 12.

A further aspect of the first exemplary embodiments relates to agreements among the eNBs 12 of the resources on which the coordinated radio resource usage are to be applied. This is desirable in order to not impose too many restrictions for the eNB 12 scheduling, i.e., it can be desirable that some portion of the radio resources be scheduled in an uncoordinated manner (i.e., uncoordinated with respect to neighboring eNBs). This aspect of the exemplary embodiments thus implies that the enhanced IRC is possible to use with the agreed upon portion of the resources. Hence, the eNB 12 then operates to prioritize scheduling of UEs experiencing a strong dominant interferer so as to use the agreed upon radio resources.

It is possible to specify the signaling between the eNBs 12 in such a manner that it is open for the eNB vendor. That is, it can be the responsibility of the eNB to decide when new signaling is sent from the eNB, and what specific actions are taken by the eNB when receiving the interference estimation-related signaling from the neighboring eNB(s). This may be viewed as being similar in some respects to ICIC schemes already specified. For example, reference can be made to section 5.2.3 of 3GPP TS 36.420 V9.0.0 (2009-12) Technical Specification 3rd Generation Partnership Project; Technical Specification Group Radio Access Network; Evolved Universal Terrestrial Radio Access Network (E-UTRAN); X2 general aspects and principles (Release 9), as well as to 3GPP TS 36.423 V9.4.0 (2010-09) Technical Specification 3rd Generation Partnership Project; Technical Specification Group Radio Access Network; Evolved Universal Terrestrial Radio Access Network (E-UTRAN); X2 application protocol (X2AP) (Release 9), section 8.3.1.

Briefly, section 8.3.1 (Load Indication) of 3GPP TS 36.423 V9.4.0 states in part that the purpose of the Load Indication procedure is to transfer load and interference co-ordination information between eNBs controlling intra-frequency neighboring cells. The procedure uses non UE-associated signalling.

For a case of successful operation, the eNB initiates the procedure by sending LOAD INFORMATION message to eNBs controlling intra-frequency neighboring cells.

If the UL Interference Overload Indication IE (information element) is received in the LOAD INFORMATION message, it indicates the interference level experienced by the indicated cell on all resource blocks, per PRB. The receiving eNB may take such information into account when setting its scheduling policy and shall consider the received UL Interference Overload Indication IE value valid until reception of a new LOAD INFORMATION message carrying an update of the same IE.

If the UL High Interference Indication IE is received in the LOAD INFORMATION message, it indicates, per PRB, the occurrence of high interference sensitivity, as seen from the sending eNB. The receiving eNB should try to avoid scheduling cell edge UEs in its cells for the concerned PRBs. The Target Cell ID IE received within the UL High Interference Information IE group in the LOAD INFORMATION message indicates the cell for which the corresponding UL High Interference Indication is meant. The receiving eNB shall consider the value of the UL High Interference Information IE group valid until reception of a new LOAD INFORMATION message carrying an update.

If the Relative Narrowband Tx Power (RNTP) IE is received in the LOAD INFORMATION message, it indicates, per PRB, whether downlink transmission power is lower than the value indicated by the RNTP Threshold IE. The receiving eNB may take such information into account when setting its scheduling policy and shall consider the received Relative Narrowband Tx Power (RNTP) 1E value valid until reception of a new LOAD INFORMATION message carrying an update.

Returning now to the discussion of the exemplary embodiments of this invention, the signaling between eNBs 12 may be viewed as "recommendations" for the preferred neighboring cell operation, or as "information sharing" related to serving cell operation, or as some combination of these.

In order to achieve the desired signaling coordination the eNBs 12 need to exchange certain information. This can be accomplished using the X2 interface (e.g., as in FIGS. 1A and 2), or via an over-the-air (wireless) eNB-eNB communication channel, or by relaying the information between eNBs 12 via the UE 10, as three non-limiting examples. In general the information exchanged can be considered as being rather static and, as a result, need not be exchanged frequently.

For coordinating the scheduling granularity and the radio resources on which the coordination is applied the eNBs 12 can exchange, for example, a starting point (index of the first PRB) as well as the granularity in terms of number of PRBs. The scheduling granularity can be matched with the resource allocation granularity. For the UL this is straightforward, but for the DL it may be preferred to conform to either the PRG sizes shown in the proposed PRB bundling table reproduced above (related to the R1-105111 CR for section 7.1.6.5 of 3GPP TS 36.213), or the resource block group (RBG) sizes listed below (as two non-limiting examples):

| System Bandwidth $N_{RB}^{DL}$ | RBG Size (P) |
|---|---|
| ≤10 | 1 |
| 11-26 | 2 |
| 27-63 | 3 |
| 64-110 | 4 |

As was explained above, the quantity $N_{RB}^{DL}$ depends on the downlink transmission bandwidth configured in the cell and fulfils $$N_{RB}^{min,DL} \leq N_{RB}^{DL} \leq N_{RB}^{max,DL}$$

where $N_{RB}^{min,DL}=6$ and $N_{RB}^{max,DL}=110$ are the smallest and largest downlink bandwidths, respectively, supported by the current version of the specification.

The inter-eNB 12 signaling can also be used for sharing the information related to orthogonal resource utilization on radio resources on which the coordinated radio resource usage is applied. Reference signals (RS) are examples of information that can be shared between the eNBs 12. The inter-eNB 12 signaling can also be used to indicate that a specific reference signal structure, that is more suitable for orthogonal RS resource utilization than the normal RS structure, is used on the coordinated radio resources. For example, information descriptive of the indices of mutually orthogonal reference signals can be exchanged. The indices may be either, for example, those indices reserved by the transmitting cell or those indices that are free to be used by other cells. This signaling can also be in the form of inter-eNB "recommendations" or "information sharing".

In accordance with further exemplary embodiments of this invention there is provided a framework for informing the UE 10 of the coordinated parameters.

These exemplary embodiments enable signaling to the UE 10 the necessary information to enhancing the interfering channel and/or covariance matrix estimation either, in the UE 10 or in the eNB 12. Specifically, to enhance estimation at the receiver of the UE 10 the UE 10 needs to be aware of what type of estimation it may perform. For example, the eNB 12 may indicate to the UE 10 what type of scheduling/precoding granularity is assumed throughout the network. The eNB 12 may also indicate those radio resources in which the UE 10 can assume which reference signals may be used for estimation in interference suppression. For example, indicating the scheduling/precoding granularity enables the filtering of interference estimates across PRB edges (boundaries), as opposed to, for IRC purposes, the HE 10 performing the estimation per PRB.

Additional signaling between the eNB 12 and UE 10 is thus defined in accordance with these exemplary embodiments in order to allow (at least) an enhanced estimation of the interference covariance matrix for interference suppression purposes. Different signaling choices (and their combinations) can be employed to implement this signaling.

One possible choice is to employ dynamic coordination signaling using the DL resource allocation grant (PDCCH). This approach is most applicable to the use of a relatively small number of signaling bits. This approach can be used, for example, to select one of the pre-defined scheduling granularities in a dynamic manner. Alternatively, it can be used to indicate that a. DL resource allocation is part of the coordinated radio resources where a pre-defined scheduling granularity can be assumed in UE 10. The scheduling granularity may be pre-defined, e.g., by broadcast signaling or by RRC signaling. Further, it is within the scope of these exemplary embodiments that the UL resource allocation is part of the coordinated radio resources, where a specific reference signal structure is to be used by the UE 10. The UL-specific reference signal structure refers to a RS structure that is more suitable for orthogonal RS resource utilization between cells than a normal RS structure.

Another possible choice is to employ semi-static RRC signaling to, for example, configure a current scheduling granularity or enable usage of a specific RS structure in the UE-specific manner. Furthermore, semi-static RRC signaling can be used to configure the frequency (and/or time resources) subject to the coordinated usage.

It should be noted that broadcast signaling is an alternative to semi-static signaling, and it can be used to configure the interference coordination signaling in a cell specific manner.

In addition, the use of dynamic signaling between an interfering eNB 12 and the UE 10 is an alternative to either or both of semi-static and broadcast signaling. Assuming that the cells are synchronized in time and the UE 10 has knowledge of the Cell IDs of the neighbor interfering eNB(s), it can then also receive and monitor (listen to) their DL control channels. The eNB 12 can, for example, announce the union of all its allocations in a subframe by a Type-0 bitmap in an existing format PDCCH or a new format PDCCH, where the CRC (cyclic redundancy code) is scrambled by the Cell ID. For 20 MHz bandwidth the channel allocations are made in chunks (partitions) of 4 PRBs (RBG), which is sufficient for interference estimation. Whenever there is a "1" in the bitmap the corresponding PRBs have the same power, precoding, modulation scheme, etc. Alternatively a "1" in the bitmap could mean that the parameters are the same as for the previous RBG. It is assumed that there are several control bits available in the DCI format (e.g. format 1), which can be used to indicate different options and additional ways of interpreting the type-0 bitmap.

The receiver complexity can be increased somewhat by the need to perform some additional blind decoding, but in any event an IRC receiver is more complex than a conventional receiver. This type of dynamic signaling has at least the advantage of increased scheduling flexibility.

Reference with regard to various PDCCH formats can be made to section 6.8.1 of the above-referenced 3GPP TS 36.211 V9.1.0. Reference with regard to DCI formats can be made to section 5.3.3.1 of 3GPP TS 36.212 V9.2.0 (2010-06) Technical Specification 3rd Generation Partnership Project; Technical Specification Group Radio Access Network; Evolved Universal Terrestrial Radio Access (E-UTRA); Multiplexing and channel coding (Release 9). Specific reference to DCI format 1 can be found in section 5.3.3.1.2 of 3GPP TS 36.212 V9.2.0.

There are a number of technical effects and various advantages that can be realized by the use of the first and the second exemplary embodiments of this invention. For example, a framework is provided for inter-cell coordinated IRC which can provide significant gains over, for example, LTE Rel-10. Further by example, these exemplary embodiments support enhanced IRC in both the UE 10 and the eNB 12. In addition, these exemplary embodiments provide a simplified IRC receiver implementation.

Based on the foregoing it should be apparent that the exemplary embodiments of this invention provide a method, apparatus and computer program(s) to provide enhanced and coordinated IRC in a wireless communication system.

Figure 3:
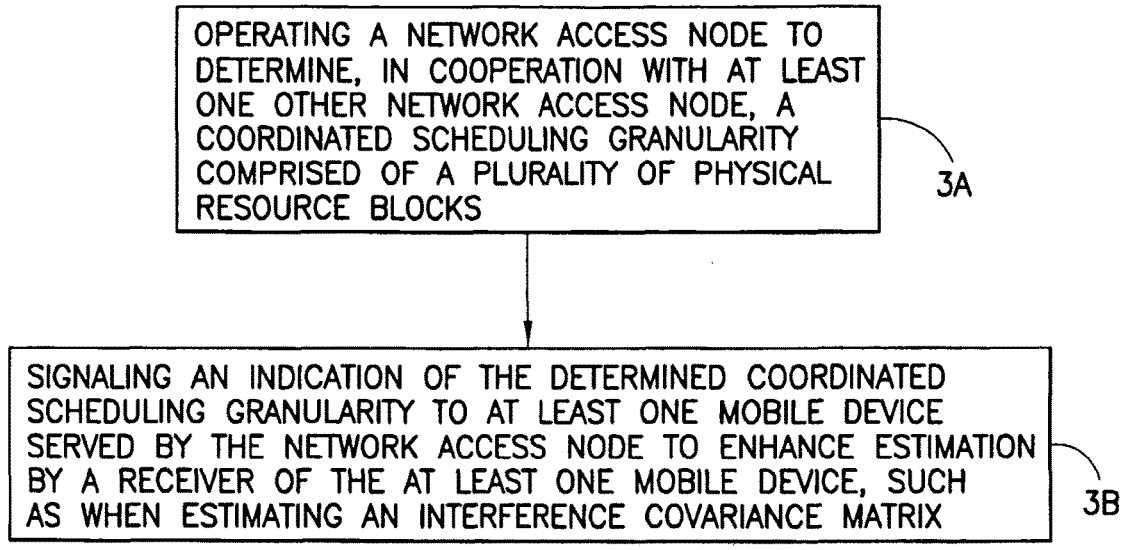
FIG. 3 is a logic flow diagram that illustrates the operation of a method, and a result of execution of computer program instructions embodied on a computer readable memory, in accordance with the exemplary embodiments of this invention.

FIG. 3 is a logic flow diagram that illustrates the operation of a method, and a result of execution of computer program instructions, in accordance with the exemplary embodiments of this invention. In accordance with these exemplary embodiments a method performs, at Block 3A, a step of operating a network access node to determine, in cooperation with at least one other network access node, a coordinated scheduling granularity comprised of a plurality of physical resource blocks. At Block 3B there is a step of signaling an indication of the determined coordinated scheduling granularity to at least one mobile device served by the network access node to enhance estimation at a receiver of the at least one mobile device, such as when estimating an interference covariance matrix.

In the method of FIG. 3, and further comprising determining, in cooperation with the at least one other network access node, coordinated orthogonal reference signal radio resources, and signaling an indication of the coordinated orthogonal reference signal radio resources to the at least one mobile device.

In the method of FIG. 3, where coordination is achieved by the use of signaling between the network access node and the at least one other network access node, where the signaling is comprised of recommendations related to inter-cell operations of the network access nodes.

In the method of FIG. 3, where coordination is achieved by the use of signaling between the network access node and the at least one other network access node, where the signaling is comprised of information sharing related to inter-cell operations of the network access nodes.

In the method of FIG. 3, where coordination of the scheduling granularity, and radio resources on which the coordination is applied, is achieved by an exchange between network access nodes of an index of a first physical resource block, and where the granularity is specified in terms of a number of physical resource blocks.

In the method of FIG. 3, and further comprising determining, in cooperation with the at least one other network access node, coordinated orthogonal reference signal radio resources information, where the coordination is achieved by an exchange between network access nodes of indices of mutually orthogonal reference signals, where the indices are one of those reserved by the network access node for transmitting in the cell of the network access node, or those that are free to be used by other network access nodes.

In the method of FIG. 3, where the signaling is one of dynamic or semi-static radio resource control signaling sent over a physical downlink control channel.

In the method of the preceding paragraph, where the dynamic radio resource control signaling specifies one of a pre-defined scheduling granularity, or indicates that a. downlink resource allocation is a part of coordinated radio resources where a pre-defined scheduling granularity can be assumed to be used by the mobile device.

In the method of the preceding paragraph, where the pre-defined scheduling granularity is specified by broadcast signaling or by radio resource control signaling.

In the method of FIG. 3, where the signaling indicates at least in part an uplink resource allocation that is a part of the coordinated radio resources, where a specific reference signal structure is to be used by the mobile device.

In the method of FIG. 3, where the signaling comprises a union of all allocations of the network access node by use of a bitmap in a physical downlink control channel wherein a cyclic redundancy code is scrambled using a cell identifier of the network access node to enable mobile devices in neighbor cells to monitor the signaling of the network access node.

The exemplary embodiments also encompass a non-transitory computer-readable medium that contains software program instructions, where execution of the software program instructions by at least one data processor results in performance of operations that comprise execution of the method of FIG. 3 and the foregoing several paragraphs descriptive of the method of FIG. 3.

The various blocks shown in FIG. 3 may be viewed as method steps, and/or as operations that result from operation of computer program code, and/or as a plurality of coupled logic circuit elements constructed to carry out the associated function(s).

Thus, the exemplary embodiments also encompass an apparatus that comprises a processor and a memory including computer program code, where the memory and computer program code are configured to, with the processor, cause a network access node to determine, in cooperation with at least one other network access node, a coordinated scheduling granularity comprised of a plurality of physical resource blocks, and to signal an indication of the determined coordinated scheduling granularity to at least one mobile device served by the network access node to enhance estimation at a receiver of the at least one mobile device, such as when estimating an interference covariance matrix.

Figure 4:
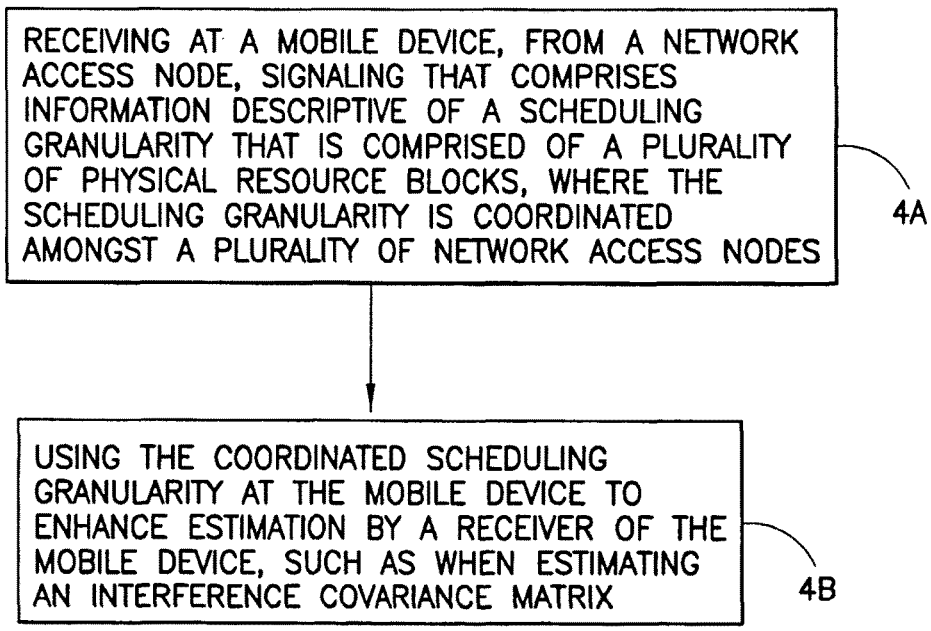
FIG. 4 is a logic flow diagram that illustrates the operation of a method, and a result of execution of computer program instructions embodied on a computer readable memory, further in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs, at Block 4A, a step of receiving at a mobile device from a network access node signaling that comprises information descriptive of a scheduling granularity that is comprised of a plurality of physical resource blocks, where the scheduling granularity is coordinated amongst a plurality of network access nodes. At Block 4B there is a step of using the coordinated scheduling granularity at the mobile device to enhance estimation at a receiver of the mobile device, such as when estimating an interference covariance matrix.

In the method of FIG. 4, and further comprising a step of receiving at the mobile device from the network access node signaling information descriptive of coordinated orthogonal reference signal radio resources.

In the method of FIG. 4, where the signaling is one of dynamic or semi-static radio resource control signaling sent over a physical downlink control channel.

In the method of the preceding paragraph, where the dynamic radio resource control signaling specifies one of a pre-defined scheduling granularity, or indicates that a. downlink resource allocation is a part of coordinated radio resources where a pre-defined scheduling granularity can be assumed to be used by the mobile device.

In the method of the preceding paragraph, where the pre-defined scheduling granularity is specified by broadcast signaling or by radio resource control signaling.

In the method of FIG. 4, where the signaling indicates at least in part an uplink resource allocation that is a part of the coordinated radio resources, where a specific reference signal structure is to be used by the mobile device.

In the method of FIG. 4, where the signaling comprises a union of all allocations of the network access node by use of a bitmap in a physical downlink control channel wherein a cyclic redundancy code is scrambled using a cell identifier of the network access node to enable mobile devices in neighbor cells to monitor the signaling of the network access node.

The exemplary embodiments also encompass a non-transitory computer-readable medium that contains software program instructions, where execution of the software program instructions by at least one data processor results in performance of operations that comprise execution of the method of FIG. 4 and the foregoing several paragraphs descriptive of the method of FIG. 4.

The various blocks shown in FIG. 4 may also be viewed as method steps, and/or as operations that result from operation of computer program code, and/or as a plurality of coupled logic circuit elements constructed to carry out the associated function(s).

Thus, the exemplary embodiments also encompass an apparatus that comprises a processor and a memory including computer program code, where the memory and computer program code are configured to, with the processor, cause a mobile device to receive from a network access node signaling that comprises information descriptive of a scheduling granularity that is comprised of a plurality of physical resource blocks, where the scheduling granularity is coordinated amongst a plurality of network access nodes. The memory and computer program code are further configured to, with the processor, use the coordinated scheduling granularity at the mobile device to enhance estimation at a receiver of the mobile device, such as when estimating an interference covariance matrix.

The exemplary embodiments of this invention also encompass an apparatus that comprises means (e.g., DP12A, MEM 12B, PROG 12C, CME 12E) for operating a network access node to determine, in cooperation with at least one other network access node, a coordinated scheduling granularity comprised of a plurality of physical resource blocks. The apparatus further comprises means (e.g., DP12A, MEM 12B, PROG 12C, transmitter of transceiver 12D) for signaling an indication of the determined coordinated scheduling granularity to at least one mobile device served by the network access node for use at least in estimating an interference covariance matrix. The apparatus further comprises means (e.g., DP12A, MEM 12B, PROG 12C, CME 12E) for determining, in cooperation with the at least one other network access node, coordinated orthogonal reference signal radio resources, where said signaling means is further configured to signal an indication of the coordinated orthogonal reference signal radio resources to the at least one mobile device.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN LTE-A type of system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., "scheduling granularity", "physical resource blocks", etc.) are not intended to be limiting in any respect, as these parameters may be identified by any suitable names. Further, the formulas and expressions that use these various parameters may differ from those expressly disclosed herein. Further, the various names assigned to different channels (e.g., PDCCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
  acquiring, by a network access node of a serving cell, information descriptive of a used scheduling granularity in at least one cell that is a neighbor cell to the serving cell, where the used scheduling granularity is courser than only one physical resource block by being comprised of a plurality of physical resource blocks,
  wherein the plurality of physical resource blocks comprising a larger portion of bandwidth than the only one physical resource block,
  wherein a covariance matrix can be estimated over the plurality of resource blocks, and
  wherein interference covariance is constant or at least continuous over the portion of the bandwidth; and
  signaling, by the network access node, an indication of the scheduling granularity that is used in the at least one neighboring cell to at least one mobile device served by the network access node of the serving cell to enhance estimation at a receiver of the at least one mobile device,
    where the indication of the scheduling granularity enhances estimation by enabling filtering interference estimates across physical resource block boundaries for interference rejection combining, and
    where the signaling directs the receiver at least to filter interference estimates across the physical resource block boundaries.

2. The method of claim 1, where the signaling of the indication of the scheduling granularity is used at the receiver at least for estimating an interference covariance matrix.

3. The method of claim 1, where the plurality of physical resource blocks conform in number to one of a number of physical resource blocks in a precoding resource block group (PRG) or in a resource block group (RBG).

4. The method as in claim 1, where the signaling is one of dynamic or semi-static radio resource control signaling sent over a physical downlink control channel.

5. The method of claim 1, where the signaling is dynamic radio resource control signaling.

6. The method of claim 1, where signaling is broadcast signaling or radio resource control signaling.

7. The method of claim 4, where a cyclic redundancy code is scrambled using a cell identifier of the network access node to enable mobile devices in neighbor cells to monitor the signaling of the network access node.

8. A non-transitory computer-readable storage medium that contains software program instructions, where execution of the software program instructions by at least one data processor results in performance of operations that comprise:
  acquiring, by a network access node of a serving cell, information descriptive of a used scheduling granularity in at least one cell that is a neighbor cell to the serving cell, where the used scheduling granularity is courser than only one physical resource block by being comprised of a plurality of physical resource blocks,
  wherein the plurality of physical resource blocks comprising a larger portion of bandwidth than the only one physical resource block,
  wherein a covariance matrix can be estimated over the plurality of resource blocks, and
  wherein interference covariance is constant or at least continuous over the portion of the bandwidth; and
  signaling, by the network access node, an indication of the scheduling granularity that is used in the at least one neighboring cell to at least one mobile device served by the network access node of the serving cell to enhance estimation at a receiver of the at least one mobile device
    where the indication of the scheduling granularity enhances estimation by enabling filtering interference estimates across physical resource block boundaries for interference rejection combining, and
    where the signaling directs the receiver at least to filter interference estimates across the physical resource block boundaries.

9. An apparatus, comprising:
a processor and a memory including computer program code, where the memory and computer program code are configured to, with the processor, cause a network access node of a serving cell to:
acquire information descriptive of a used scheduling granularity in at least one cell that is a neighbor cell to the serving cell, where the used scheduling granularity is courser than only one physical resource block by being comprised of a plurality of physical resource blocks,
   wherein the plurality of physical resource blocks comprising a larger portion of bandwidth than the only one physical resource block,
   wherein a covariance matrix can be estimated over the plurality of resource blocks, and
   wherein interference covariance is constant or at least continuous over the portion of the bandwidth; and
signal an indication of the scheduling granularity that is used in the at least one neighboring cell to at least one mobile device served by the network access node of the serving cell to enhance estimation at a receiver of the at least one mobile device,
   where the indication of the scheduling granularity enhances estimation by enabling filtering interference estimates across physical resource block boundaries for interference rejection combining, and
   where the signaling directs the receiver at least to filter interference estimates across the physical resource block boundaries.

10. The apparatus of claim 9, where the signaled indication of the scheduling granularity is used at the receiver at least for estimating an interference covariance matrix.

11. The apparatus of claim 9, where the signaling is one of dynamic or semi-static radio resource control signaling sent over a physical downlink control channel.

12. The apparatus of claim 9, where the plurality of physical resource blocks conform in number to one of a number of physical resource blocks in a precoding resource block group (PRG) or in a resource block group (RBG).

13. The apparatus of claim 9, where the received signaling is broadcast signaling or radio resource control signaling.

14. A method, comprising:
receiving signaling at a mobile device from a network access node of a cell serving the mobile device, the received signaling comprising information descriptive of a scheduling granularity that is used in at least one cell that is a neighbor cell to the cell serving the mobile device, where the scheduling granularity is courser than only one physical resource block by being comprised of a plurality of physical resource blocks,
   wherein the plurality of physical resource blocks comprising a larger portion of bandwidth than the only one physical resource block,
   wherein a covariance matrix can be estimated over the plurality of resource blocks, and
   wherein interference covariance is constant or at least continuous over the portion of the bandwidth; and
using the information in the received signaling, that is descriptive of the scheduling granularity, at the mobile device to enhance estimation at a receiver of the mobile device, by enabling filtering interference estimates across physical resource block boundaries for interference rejection combining, to at least perform the filtering of interference estimates across the physical resource block boundaries.

15. The method of claim 14, where the scheduling granularity is used at the mobile device when estimating an interference covariance matrix.

\* \* \* \* \*